United States Patent [19]

Hooker, III

[11] 4,414,583
[45] Nov. 8, 1983

[54] SCANNED LIGHT BEAM IMAGING METHOD AND APPARATUS

[75] Inventor: Ross B. Hooker, III, Boulder, Colo.

[73] Assignee: International Business Machines Corporation, Armonk, N.Y.

[21] Appl. No.: 317,691

[22] Filed: Nov. 2, 1981

[51] Int. Cl.³ .............................................. H04N 1/30
[52] U.S. Cl. ................................... 358/300; 358/208; 358/285
[58] Field of Search ............... 358/285, 300, 208, 293, 358/294

[56] References Cited

U.S. PATENT DOCUMENTS

| 3,144,637 | 8/1964 | Adams. | |
| 3,461,227 | 8/1969 | Perreault | 358/285 |
| 3,646,256 | 2/1972 | Jacob | 358/288 |
| 3,727,062 | 4/1973 | Foster | 455/611 |
| 3,809,806 | 5/1974 | Walker | 358/206 |
| 4,046,471 | 9/1977 | Branham | 358/300 |
| 4,180,822 | 12/1979 | Hudson | 346/108 |
| 4,270,131 | 5/1981 | Tompkins | 358/285 |
| 4,342,050 | 7/1982 | Traino | 358/300 |

Primary Examiner—Howard Britton
Attorney, Agent, or Firm—J. G. Cockburn; C. E. Rohrer

[57] ABSTRACT

In the use of a scanned light beam for optical imaging, a random motion modulation is applied to the light beam orthogonally to the scan direction to break up any unscanned or overlapped interstices between adjacent scan lines to make the interstices appear nearly invisible.

20 Claims, 3 Drawing Figures

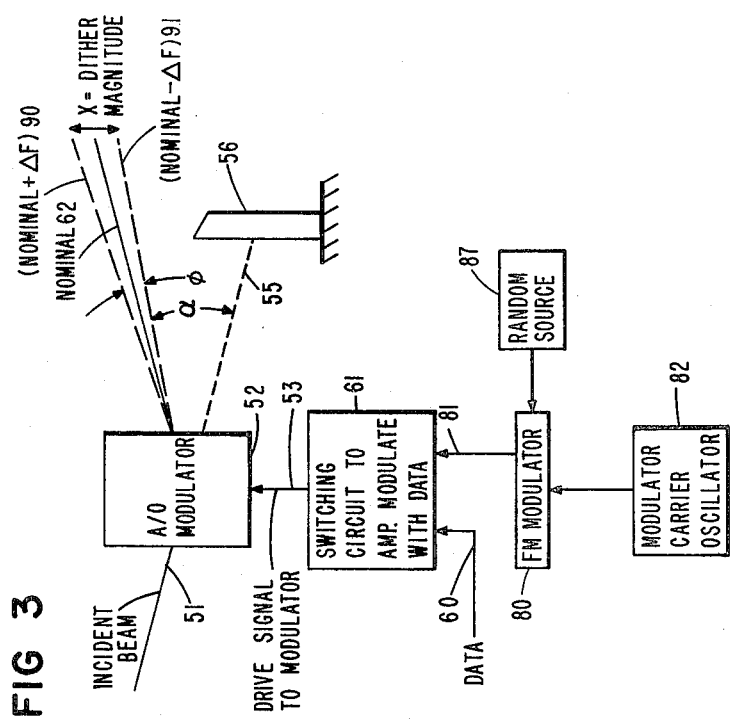
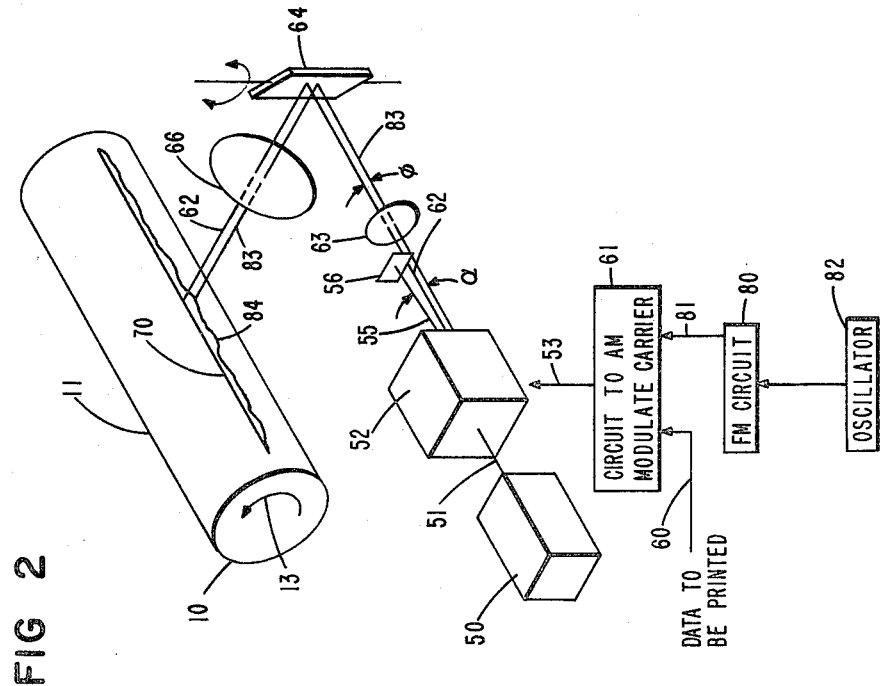

SCANNED LIGHT BEAM IMAGING METHOD AND APPARATUS

BACKGROUND OF THE INVENTION

This invention relates to optical imaging and more particularly to optical imaging utilizing a scanned light beam.

Scanned light beam imaging is employed for various purposes including electrophotographic printing, as in the IBM 6670 Information Distributor.

In such systems used for printing, a light beam generated, for example, by a laser is selectively modulated to vary its amplitude while it is scanned laterally across a moving photoconductor to selectively discharge the photoconductor. Such systems have been binary in nature ("on" or "off") to accomplish printing of character information by selectively either exposing the photoconductor or leaving it unexposed. To insure complete exposure, adjacent scan lines are usually overlapped slightly. Thus, any slight misalignment of the scans or change in beam size would not be noticed.

This cannot be done if the light beam modulation is other than binary because in any partial exposure, a substantial overlap would appear as a stripe of complete exposure. Alternatively, spacing the scans apart would appear as a stripe that remains unexposed. To attempt to prevent such stripes by substantially eliminating the optical and mechanical tolerances from the system would appear to be prohibitively expensive.

It is therefore an object of the present invention to eliminate the perception of elongated stripes in such optical imaging systems without requiring substantial tightening of allowable optical or mechanical tolerances.

SUMMARY OF THE INVENTION

According to the invention, an improvement to scanned light beam imaging apparatus is provided, having beam modulation apparatus for displacing the light beam orthogonally to the direction of scan in response to a modulation signal, and a source of a random modulation connected to the beam modulation apparatus for supplying a random modulation signal thereto. Thus, the beam modulation apparatus modulates the light beam randomly in the orthogonal direction to break up any interstices between adjacent scan lines.

According to another aspect of the present invention, a method of scanned light beam imaging is provided wherein a light beam is scanned in a first direction in parallel lines across an imaging surface, and the light beam is simultaneously randomly displaced in a direction orthogonal to the first direction to break up any interstices between adjacent scan lines.

BRIEF DESCRIPTION OF THE DRAWINGS

FIG. 2 is a diagrammatic view of a scanned light beam imaging system of the present invention.

FIG. 3 is a detailed diagrammatic view of the light beam modulation of the present invention.

DESCRIPTION OF THE INVENTION

Figure 1:
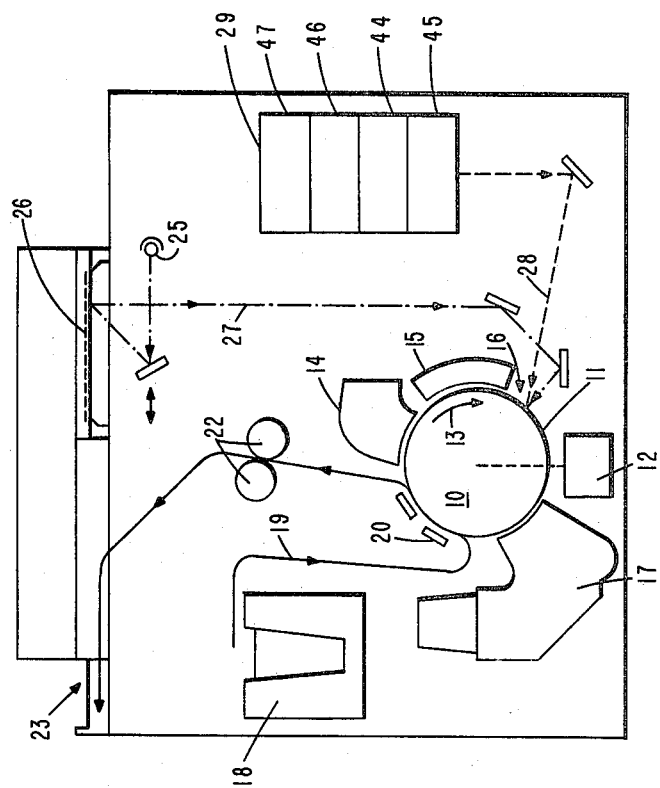
FIG. 1 is a diagrammatic view of a printing device employing the scanned light beam imaging of the present invention.

FIG. 1 illustrates a copier/printer machine employing scanned light beam imaging on an electrophotographic drum 10. The surface of the drum comprises a photoconductor which is either coated on the surface of the drum or is in the form of a sheet material wrapped around the surface of the drum. It is understood that other types of photoconductors, such as belts or any other type of imaging medium may be employed. In the printing device of FIG. 1, the photoconductor on drum 10 is surrounded by elements or stations required for the electrophotographic process. A motor 12 rotates the drum 10 in the direction of arrow 13 so as to move any element of the photoconductor surface sequentially from station to station. A cleaning station 14 is provided to remove any debris, such as toner, from the photoconductor 11 and thereby prepare the photoconductor for imaging. A charging corona station 15 is provided to subject the photoconductor 11 to a uniform electrostatic charge. The uniform charge is selectively discharged at an imaging station 16 to generate a latent image of charge on the photoconductor 11. A developer 17 applies toner to the latent electrostatic image, which toner is attracted to the charged areas of the image. The toner thereby renders the image visible. Paper is provided from bin 18 via paper path 19 to transfer station 20. The transfer station includes a corona which causes the toner particles of the developed image to be attracted to the paper, thus removing the developed image from the photoconductor to the paper. The paper is then transported to a fuser station 22 where the particles are fixed to the paper permanently. The paper with the fixed image is then supplied to an output bin 23.

The latent image is generated at imaging station 16 by either light from lamp 25 reflected from the surface of an original sheet 26, as shown by line 27; or by scanned light beam 28 provided by modulation and scanning apparatus 29.

A copier/printer machine of the type descrbed is further described in detail in U.S. Pat. No. 4,046,471 to F. L. Branham. Such machines, when printing, are employed primarily for the printing of characters with the light beam 28. As an example, a character generator 44 supplies the signals to a laser printhead 45 which modulates the laser beam in binary fashion, "on" or "off", the data having been supplied by a data processor 47 to a page buffer 46.

FIG. 2 illustrates a laser printhead assembly modified in accordance with the present invention. A laser 50 generates a coherent light beam 51 which is directed through an acousto-optic modulator 52. The acousto-optic modulator selectively deflects the light beam 51 in accordance with an input signal provided at input 53. The unmodulated, or "zero-order" beam 55 from the acousto-optic modulator is intercepted by a knife edge 56.

A signal representing the data to be printed is supplied at input 60 to amplitude modulation circuit 61. The amplitude modulation signal is supplied by circuit 61 to input 53 of the acousto-optic modulator. The acousto-optic modulator deflects the light beam 51 in accordance with the presence or absence of the amplitude modulation in the direction of angle $\alpha$. The amount $\alpha$ of deflection is determined by the modulation frequency.

The modulation signal applied at input 53 is an amplitude modulated carrier signal. This can result in a grey-scale effect on the imaging of the light beam in that the amplitude modulation varies the duration of the carrier causing the light beam to be deflected beyond the knife edge 56.

The deflected light beam 62 is projected through beam expanding lens 63 to beam deflector 64. Beam deflector 64 may comprise an oscillating mirror or as described in the above patent, a rotating mirror assembly having many facets about the periphery thereof.

The beam deflected by deflector 64 is projected through imaging lens 66 onto the photoconductor surface 11 of drum 10. Beam deflector 64 causes the modulated beam 62 to be scanned axially of drum 10 along line 70 across the photoconductor surface 11.

As discussed above, the amplitude modulation at input 53 to the acousto-optic modulator results in the deflection of the coherent light beam 51, as shown by deflected beam 62. The modulation is of a carrier signal. Therefore, amount of amplitude modulation controls the time duration that the beam 62 will be deflected beyond knife edge 56, resulting in different exposure times of the portion of the photoconductor 11 being scanned.

The beam spot size, and therefore the width of the trace 70 made by beam 62 on the photoconductor 11 may be the subject of slight variations. These variations may be from machine to machine, as variations in the provided laser or in the acousto-optic modulator, or in distance tolerances, as in the distance from lens 66 to surface 11 of drum 10. Variations may also occur due to different operating conditions for a single machine, such as temperature causing a difference in laser output, etc. Lastly, and most importantly, periodic variations may occur within a single machine, such as vibrations within the printhead, misalignment of the rotating deflector, or facet-to-facet angular variations on the deflector itself.

Any of these variations results in the appearance of interstices between adjacent scan lines 70. For example, should the beam be slightly low on one scan, and normal or slightly high on the next adjacent scan, the two scan lines will overlap slightly. On the other hand, should the one scan be slightly high, and the next adjacent scan normal or slightly low, the adjacent scan line will be separated slightly. Either the overlap or the separation of adjacent scan lines are defined herein as interstices.

The subject invention comprises the method of moving, and the modification to the above apparatus to move, the light beam orthogonally with respect to the scan direction as shown by scan line 70 to break up any unscanned or overlapped interstices between adjacent scan lines to make the interstices appear nearly invisible.

The modification comprises a frequency modulation circuit 80 for supplying a frequency modulation carrier signal to carrier input 81 of amplitude modulation circuit 61. An oscillator 82 supplies the basic carrier signal to the frequency modulation circuit 80.

As will be described, frequency modulation circuit 80 includes a source of random modulation and frequency modulation means for modulating the carrier signal in accordance with the random modulation. The signal supplied by frequency modulation circuit 80 to input 81, therefore, comprises a carrier signal which varies in frequency in accordance with the random modulation. The frequency modulated carrier is then amplitude modulated by circuit 61 and supplied at input 53 of acousto-optic modulator 52. The resultant variations in frequency cause the amplitude modulated light beam 62 to be deflected as shown by the dither angle $\phi$ which is about the nominal amplitude modulation angle $\alpha$.

Thus, the method is to produce a dither deflection of beam 83 orthogonal to the scan line and produce thereby a scan line 84 variably displaced from the scan path 70 with no dither. The displacement of the scan path 84 is shown in FIG. 2 greatly exaggerated for the purpose of illustration. In reality, the dither displacement is very small, typically much less than the center-to-center displacement between adjacent scan lines.

For best results, the average or the fixed magnitude of frequency modulation change should be sufficient to cause a displacement of the dithered beam 83 equal to the maximum interstice expected. Further, the frequency of modulation should be at least 1/10 the data rate of picture data for producing the scan line 70. This is also called the picture element rate, or pel rate. Thus, the interstice appearing between adjacent scan lines is interrupted many times in a scan.

DETAILED DESCRIPTION OF THE INVENTION

An exemplary machine in which the subject invention may be employed is the IBM 6670 Information Distributor. The 6670 employs the laser and photoconductor electrophotographic process, and this process appears sensitive to beam displacements. Specifically, in that process, rather small beam displacement can lead to visible interstices. For example, a beam displacement of 0.0002 inches (only 1/20 the spacing of successive laser scan lines) may be visible. This sensitivity is caused by the tendency of the electrophotographic process to enhance gradients in the charge distribution on the photoconductor. That is, relatively small peak-to-peak charge variations will be developed and appear visible if the variation occurs over a small spacial region.

A major way of printing grey scales will be to control the laser power. Thus, in printing a uniformly grey area, the laser beam will be adjusted to a fraction of its normal power. In this situation, any interstices are of low contrast, but are highly visible. This may be due to the use of a bias voltage at the developer station which effectively makes the electrophotographic process saturate after a certain amount of energy is incident on the photoconductor. Thus in binary situations, variations in energy such as caused by beam displacement, will have no effect as long as the photoconductor is discharged past the developer bias level. On the other hand, when employing the laser at lower powers to print grey levels, the developer will try to develop out variations in discharge and the scan interstices will appear. Thus, in any true grey scale printing, rather than binary printing, very small raster errors will produce highly visible interstices.

Traditionally, means for solving beam displacement errors which may create interstices is by tightening tolerances in the laser printhead assembly, removing sources of vibration, and by controlling machine tolerances to insure that the raster is formed perfectly. As can be easily visualized, this approach adds a great deal of cost to the printhead and machine and may not be truly achievable with grey scale printing.

The circuitry of FIG. 2 is replicated in FIG. 3 with a diagrammatic illustration in more detail of the effect of the acousto-optic modulator 52 upon the incident light beam 51. The zero-order beam 55 is the path taken by the unmodulated beam. When an input signal of high frequency is supplied to input 53 of the acousto-optic modulator, the incident beam 51 is deflected to the nominal deflection path 62. Using a frequency of, for example, 80 MHz, as supplied by oscillator 82, the resultant deflection angle is 13.9 milliradians. The nominal deflection is shown by angle $\alpha$.

The acousto-optic modulator 52 works on the principle that an acoustic wave generated by the signal at input 53 deflects the light beam in accordance with frequency of the input signal. The amplitude modulation provided by circuit 61 does not in itself provide grey scale, but rather supplies the drive signal from oscillator 82 at a sufficient amplitude to cause operation of the acousto-optic modulator.

Something akin to grey scale can be produced by an amplitude modulation at circuit 61 wherein the time duration of the data signal at input 60 varies in accordance with the grey scale level to be reproduced. The incident beam 51 will therefore be deflected and expose the photoconductor for an amount of time corresponding to the duration of the data signal. In this manner, a pseudo-dot pattern may be used to give the appearance of a grey scale reproduction.

A different way of producing grey scale is to control the power of the laser or other light source providing the beam 51. Thus, the presence or absence of data will be controlled by the amplitude modulation signal appearing at input 60, but the grey scale level of that information will be controlled by the power of the incident beam 51.

In either of these grey scale reproduction techniques, any interstices between adjacent scan lines will be highly visible, as discussed above.

These interstices may be broken by the application of dither through the operation of circuit 80 of FIG. 2, shown in FIG. 3 as comprising FM modulator 86 and a random source 87. Dither has two properties which may be specified: (1) the maximum amount, or amplitude, of dither, and (2) the frequency, or rate of change, of the dither. Dither amplitude comprises the difference in amount of deflection from that comprising the nominal path at the center frequency modulation frequency 62. The total extent comprising the maximum amplitude of dither comprises the angular difference $\phi$ between path 90 and 91. At the photoconductor, this total difference may be represented as the distance x. This amplitude is controlled by varying the total frequency excursion of the modulator carrier derived from circuit 82 from its nominal frequency. The frequency, or rate of change, of the dither is controlled by random source 87 in modulating the carrier at FM modulator 86 by controlling the rate of change of the modulator carrier frequency.

The maximum amplitude of the dither chosen depends upon the maximum displacement error expected between adjacent scan lines. For example, the maximum displacement error, comprising the overlap or the separation between adjacent scans of the laser beam, may comprise 0.0004 inches.

With the exemplary nominal carrier frequency of circuit 82 at 80 MHz, a dither maximum amplitude x of 0.4 mils, would, in an exemplary machine having a distance of approximately 25 inches between the acousto-optic modulator 52 and the photoconductor 11, would comprise 16 microradians. Since the 80 MHz input signal at input 53 to the acousto-optic modulator produces a deflection $\alpha$ of 13.9 milliradianns, the total frequency change, or $\Delta f$, required to produce the desired 16 microradian dither $\phi$ is 46 KHz.

In the example of the IBM 6670 Information Distributor, the exemplary 4/10 mil dither is only one-tenth of the separation of the raster lines. Therefore, the decrease in print quality associated with the dithering effect (i.e., "smearing") is totally negligible.

As a highly unusual or extreme example, one might want to correct for plus or minus one-half a raster line, or as an example, about plus or minus 2 mils. This would require a maximum change in frequency, or $\Delta f$, of 500 KHz. In such an example, where large displcement variations are to be corrected by large dithers, then there is a possible degradation in quality of the resultant printing.

The frequency, or rate of change, of the dither should be sufficiently high to fully scramble any scan line interstices. Ideally, one would vary the dither at about the pel rate, although a somewhat slower rate still does not produce visible scan lines. A pel is the acronym for a picture element, which is a single unit of picture data. For higher quality printing the largest pel is 1/240 of an inch. As an absolute minimum, the frequency of dither cannot drop below 1/10 the pel rate.

Most importantly, the dither must be changed randomly, preferably by frequency, possibly by magnitude or by both, to prevent any kind of a pattern from forming. Should any regular pattern appear, the eye is able to quickly perceive it.

Overall, the interstices one identifies in an undithered system are most noticeable in large areas of uniform shading and areas having little detail. In these areas, a large dither should be applied because the scan lines are most apparent. Yet, a large dither is not apt to degrade the image quality here because there is little detail. A dither is not required in regions where there is great detail or contrast. Consequently, the frequency modulation circuit 80 may be modified to vary the dither in inverse portion to the contrast difference between adjacent regions of two successive scan lines.

In an exemplary arrangement, an acousto-optic modulator 52 may comprise a commercially available Harris Corp. modulator Model H-211 or Model H-213. AM modulator circuit 61, oscillator 82, and FM modulator 86 may comprise commercially available Harris Corp. driver Model 436431-GO1. A random source means 87 may comprise Hewlett Packard noise source Model HP346B.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. An electrophotographic machine for producing printed sheets bearing an image of data produced on an electrophotographic medium by a scanning light beam driven across said medium in line by line fashion, comprising:

an electrophotographic medium;
charging means for charging said medium to a uniform electrostatic charge;
imaging means for selectively discharging said medium in accordance with data to be reproduced in order to produce a desired latent image, said imaging means including a light source for producing a light beam and scanning means for repeatedly scanning said light beam in parallel and adjacent linear scan lines across said electrophotographic medium, said imaging means further including beam modulation means including data signal producing means for causing said beam to produce said latent image in accordance with data desired for reproduction, said beam modulation means further including random signal means for displacing said light beam in a random manner orthogonal to said linear scan lines to prevent the development of a regular interstitial pattern at the boundaries of adjacent scan lines;

developer means for applying toner to said latent image to render said image visible; and fuser means for fusing the toned image to a printed sheet.

2. The apparatus of claim 1 wherein:
said random signal means produces a signal with a minimum modulation frequency of 1/10 of the picture element rate of said data.

3. The apparatus of claim 1 wherein:
said random signal means produces a signal random in amplitude of modulation and random in frequency of modulation.

4. The apparatus of claim 1 wherein said imaging means produces a picture element rate of about 40 per inch of scan of said means for repeatedly scanning; and wherein:
said random signal means produces a signal with a minimum rate of frequency modulation of 24 times per inch of scan.

5. The apparatus of claim 1 wherein:
said random signal means produces a signal fixed in amplitude and random in frequency.

6. The apparatus of claim 5 wherein:
said fixed amplitude of said random signal means is sufficient to drive said beam modulation means to displace said light beam orthogonally the distance of the widest of said interstices between said adjacent linear scans.

7. The apparatus of claim 1 wherein:
said random signal means produces a signal which is fixed in amplitude of frequency modulation and random in rate of frequency modulation.

8. The apparatus of claim 7 wherein:
the fixed amplitude of the random frequency signal is sufficient to drive said beam modulation means to displace said light beam orthogonally the distance of the widest of said interstices between said adjacent linear scans.

9. The apparatus of claim 8 wherein:
said beam modulation means displaces said light beam orthogonally by an amplitude directly related to said amplitude of frequency modulation of said random frequency modulation signal.

10. The apparatus of claim 8 wherein:
said beam modulation mens comprises means for deflecting said light beam and thereby displacing said light beam orthogonally.

11. The apparatus of claim 1 wherein:
said beam modulation means displaces said light beam orthogonally by an amplitude directly related to the amplitude of the signal produced by said random signal means.

12. The apparatus of claim 6 wherein:
said random signal means produces a signal with a maximum modulation amplitude sufficient to drive said beam modulation means to displace said light beam orthogonally the distance of the widest of said interstices between said adjacent linear scans.

13. The apparatus of claim 11 wherein:
said random signal means produces a signal with an average modulation amplitude of value to drive said beam modulation means to displace said light beam orthogonally one-half the distance of the widest of said interstices between said adjacent linear scans.

14. The apparatus of claim 11 wherein:
said beam modulation means additionally comprises an acousto-optic modulation means.

15. The apparatus of claim 11 wherein:
said random signal means additionally produces a signal with a random frequency for causing said acousto-optic modulation means to deflect said light beam and thereby displace said light beam orthogonally in a random manner.

16. The apparatus of claim 1 wherein:
said beam modulation means additionally comprises an acousto-optic modulation means.

17. The apparatus of claim 16 wherein:
said acousto-optic modulation means is responsive to the signal produced by said random signal means for deflecting said light beam to thereby displace said light beam orthogonally.

18. The apparatus of claim 17 wherein:
said random signal means comprises a source of a center frequency, modulated by a fixed amplitude of frequency change and random in rate of frequency modulation.

19. The apparatus of claim 18 wherein said imaging means supplies picture element imaging data to said light beam; and wherein:
said random signal means produces a signal with a minimum rate of frequency modulation of 1/10 the picture element rate of said supplied imaging data.

20. The apparatus of claim 18 wherein:
said fixed amplitude of frequency change is sufficient to drive said acousto-optic modulation means to displace said light beam orthogonally the distance of the widest of said interstices between said adjacent linear scans.

* * * * *

UNITED STATES PATENT AND TRADEMARK OFFICE
CERTIFICATE OF CORRECTION

PATENT NO. : 4,414,583
DATED : November 8, 1983
INVENTOR(S) : Ross B. Hooker, III It is certified that error appears in the above—identified patent and that said Letters Patent is hereby corrected as shown below:

Claim 10, line 2, (top of col. 8), delete "mens" and insert --means--.

Claim 12, line 1 (col. 8, line 9), delete "6" and insert --11--.

Claim 15, line 1 (col. 8, line 25), delete "11" and insert --14--.

Signed and Sealed this

Fourteenth Day of February 1984

[SEAL]

Attest:

GERALD J. MOSSINGHOFF

Attesting Officer

Commissioner of Patents and Trademarks